United States Patent
Zaguroli, Jr.

(10) Patent No.: US 11,820,630 B2
(45) Date of Patent: Nov. 21, 2023

(54) ELECTRICAL ENCLOSURE COMBINED WITH LIFTING DEVICE SUPPORT RAILS

(71) Applicant: Knight Industries & Associates, Inc., Auburn Hills, MI (US)

(72) Inventor: James Zaguroli, Jr., Auburn Hills, MI (US)

(73) Assignee: Knight Industries & Associates, Inc., Auburn Hills, MI (US)

( * ) Notice: Subject to any disclaimer, the term of this patent is extended or adjusted under 35 U.S.C. 154(b) by 591 days.

(21) Appl. No.: 16/826,771

(22) Filed: Mar. 23, 2020

(65) Prior Publication Data

US 2021/0087025 A1 Mar. 25, 2021

Related U.S. Application Data

(60) Provisional application No. 62/903,229, filed on Sep. 20, 2019.

(51) Int. Cl.
*B66C 13/22* (2006.01)
*B66F 13/00* (2006.01)
*B60M 1/12* (2006.01)

(52) U.S. Cl.
CPC ............. *B66C 13/22* (2013.01); *B60M 1/12* (2013.01); *B66F 13/00* (2013.01)

(58) Field of Classification Search
CPC ........... E01B 25/24; B66F 13/00; B60M 1/12; B66C 13/22; B66C 7/04; B66C 7/02; B66C 7/08; B66C 7/10; B66C 9/18
See application file for complete search history.

(56) References Cited

U.S. PATENT DOCUMENTS

| | | | | |
|---|---|---|---|---|
| 1,921,109 A | * | 8/1933 | Webb | B61B 10/025 104/95 |
| 3,039,401 A | * | 6/1962 | Bishop | B65G 21/22 104/111 |
| 3,217,658 A | * | 11/1965 | Dehne | B65G 21/22 104/111 |
| 3,559,585 A | * | 2/1971 | Lempio | B61B 10/025 104/172.4 |
| 3,690,269 A | * | 9/1972 | Hempstead | B61B 10/025 104/172.4 |
| 3,880,086 A | * | 4/1975 | Khondker | B61B 10/02 104/111 |

(Continued)

FOREIGN PATENT DOCUMENTS

| | | | | |
|---|---|---|---|---|
| DE | 4342106 A1 | * | 6/1995 | B66C 7/02 |
| DE | 10337126 B3 | * | 6/2005 | B66C 7/02 |

(Continued)

*Primary Examiner* — Patrick D Hawn
(74) *Attorney, Agent, or Firm* — Carlson, Gaskey & Olds, P.C.

(57) ABSTRACT

A plate assembly for mounting an electrical enclosure in a position vertically aligned atop an overhead rail used to support a traveling hoist which traverses back and forth along the rails on a trolley. The plate assembly includes a plate which is shaped like an inverted U by a central opening extending up from the bottom with mounting portions projecting normal to the plate which are configured to be attached to the enclosure when installed in the opening at the top and to respective rail pieces clamped against respective sides of the opening.

4 Claims, 8 Drawing Sheets

(56) References Cited

U.S. PATENT DOCUMENTS

| | | | | |
|---|---|---|---|---|
| 4,635,558 | A * | 1/1987 | Hoehn | E01B 25/24 104/111 |
| 4,694,531 | A * | 9/1987 | Foy | A47H 1/144 104/111 |
| 5,400,717 | A * | 3/1995 | Hoehn | B61B 10/025 104/94 |
| 5,598,784 | A * | 2/1997 | Kubsik | B65G 21/06 104/111 |
| 5,598,785 | A * | 2/1997 | Zaguroli, Jr. | B66C 7/04 104/111 |
| 5,768,998 | A * | 6/1998 | Enderlein | B61B 10/02 104/111 |
| 5,957,057 | A * | 9/1999 | Nakamura | E01B 25/24 104/111 |
| 6,499,408 | B1 * | 12/2002 | Kundel, Sr. | E01B 25/24 104/111 |
| 7,004,076 | B2 * | 2/2006 | Traubenkraut | B65G 21/22 104/111 |
| 7,028,618 | B2 * | 4/2006 | Wallner | B66C 11/06 105/29.1 |
| 7,392,747 | B2 * | 7/2008 | Ksyk | E05D 15/0608 104/111 |
| 7,467,723 | B2 * | 12/2008 | Zaguroli, Jr. | B66D 3/18 212/331 |
| 7,997,433 | B2 * | 8/2011 | Birkigt | B66C 7/04 104/111 |
| 9,091,026 | B2 * | 7/2015 | Spies | B66C 7/08 |
| 10,443,896 | B2 * | 10/2019 | Haddock | F24S 25/615 |
| 2021/0123546 | A1 * | 4/2021 | Zaguroli, Jr. | F16L 3/20 |

FOREIGN PATENT DOCUMENTS

| | | | | |
|---|---|---|---|---|
| DE | 202006008149 | U1 * | 11/2006 | B62D 65/18 |
| DE | 202007013322 | U1 * | 1/2008 | B66C 7/08 |
| DE | 202010007517 | U1 * | 9/2010 | B66C 7/02 |
| DE | 202016102416 | U1 * | 6/2016 | B66C 7/02 |
| EP | 0894762 | A1 * | 2/1999 | |
| EP | 2857341 | A2 * | 4/2015 | B66C 7/02 |
| GB | 2284849 | A * | 6/1995 | B66C 7/04 |
| JP | 2000219483 | A * | 8/2000 | B66C 7/04 |

* cited by examiner

ELECTRICAL ENCLOSURE COMBINED WITH LIFTING DEVICE SUPPORT RAILS

CROSS REFERENCE TO RELATED PATENT APPLICATIONS

This application claims the benefit of U.S. provisional application Ser. No. 62/903,229 filed on Sep. 20, 2019.

BACKGROUND OF THE INVENTION

This invention concerns material handling apparatus and more particularly lifting devices such as hoists commonly used in assembly plants.

The lifting device is supported on a trolley running on a pair of overhead rails to reach parts that need to be lifted up by operation of the lifting device.

The lifting device is operated by electricity and thus electrical power must be connected to the lifting device at all positions along the overhead rails.

Since a hoist or other lifting device may be moved substantial distances along the rails on its trolley, simply connecting a long electrical cable to the lift is considered to be unsafe since a long length of exposed electrical cable being pulled along the rails is vulnerable a hazard.

Electrical contacts in an enclosure constructed of a non-conductive plastic have heretofore been developed to eliminate exposed power cables to a movable lift device by connecting a short cable to a moveable trolley which has electrical contacts moved along tracks and is engaged within the enclosure. The short cable is connected to the lifting device and is moved along the rails with the lifting device.

Such non-conductive plastic enclosures are currently available commercially for use with various moving powered equipment such as from Condunit-Wampler, U.S.A. Omaha, Nebraska.

The electrical enclosure is typically comprised of a rectangular in section elongated plastic electrical enclosure which has internal metal conductive tracks extending substantially along the complete length of the enclosure.

An input power cable is connected to the tracks at one end of the enclosure while an enclosure trolley has rollers which are received in a slot in the bottom of the enclosure to be guided along the length of the enclosure.

The lift trolley and the enclosure trolley must move together and thus are physically connected together in some fashion.

In prior practice, the electrical enclosure was typically mounted on one side of the lift support rails.

This requires a precise mounting of the enclosure to the lift trolley because of the need for accurate alignment so that both the enclosure track trolley and the lift trolley move together, the need for such precision increases costs.

Such enclosures also have a further drawback in that dust can enter enclosure through an exposed central bottom slot which accommodates the contact trolley. Such dust can affect the reliability of the electrical contacts and special covers are often installed over portions of the slot to reduce the entry of dust.

Accordingly, it is an object of the invention to provide support rails combined with an electrical enclosure in a manner which easily carried out while ensuring precision alignment of these components.

It is a further object to provide such combination which is configured to minimize the entrance of dust into the electrical enclosure without requiring the use of covers installed over the central bottom facing slot.

SUMMARY OF THE INVENTION

The above objects are achieved by mounting an electrical conductor enclosure on a pair of lift support rails to a locator-support plate assembly so as to be in vertical alignment with each other. The locator-support plate assembly has an opening therein comprised of a rectangular upper portion slidably receiving the electrical enclosure and a wider lower opening segment receiving a pair of rail pieces mounted to a respective side of the legs of the plate assembly. The pair of separate spaced apart rail pieces are each mounted to a respective side of a lower opening portion. An upper end of each rail piece has a portion projecting towards the other rail piece a distance so as to be located beneath a respective side part of the electrical enclosure and resting thereon to be accurately aligned.

A lower end of each rail piece has a portion projecting towards the other rail piece portion a distance such as to support trolley rollers resting thereon so that the rollers are directly below said enclosure so as to allow the rollers to freely move along the rail piece portions as a hoist or other overhead equipment is advanced on the rails in either direction.

The electrical enclosure is vertically aligned with a slot between the rail piece portions so that an enclosure trolley extends down into the space between the rail piece portions. The rail pieces enclose the area below the enclosure thereby greatly reducing the possibility of entry of dust into the enclosure since the dust must move up a substantial distance to gain entrance to the enclosure.

A series of support-locator plate assemblies can be provided along the length of the support rails spaced apart as necessary to provide adequate support for lift such as hoists supported thereby.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
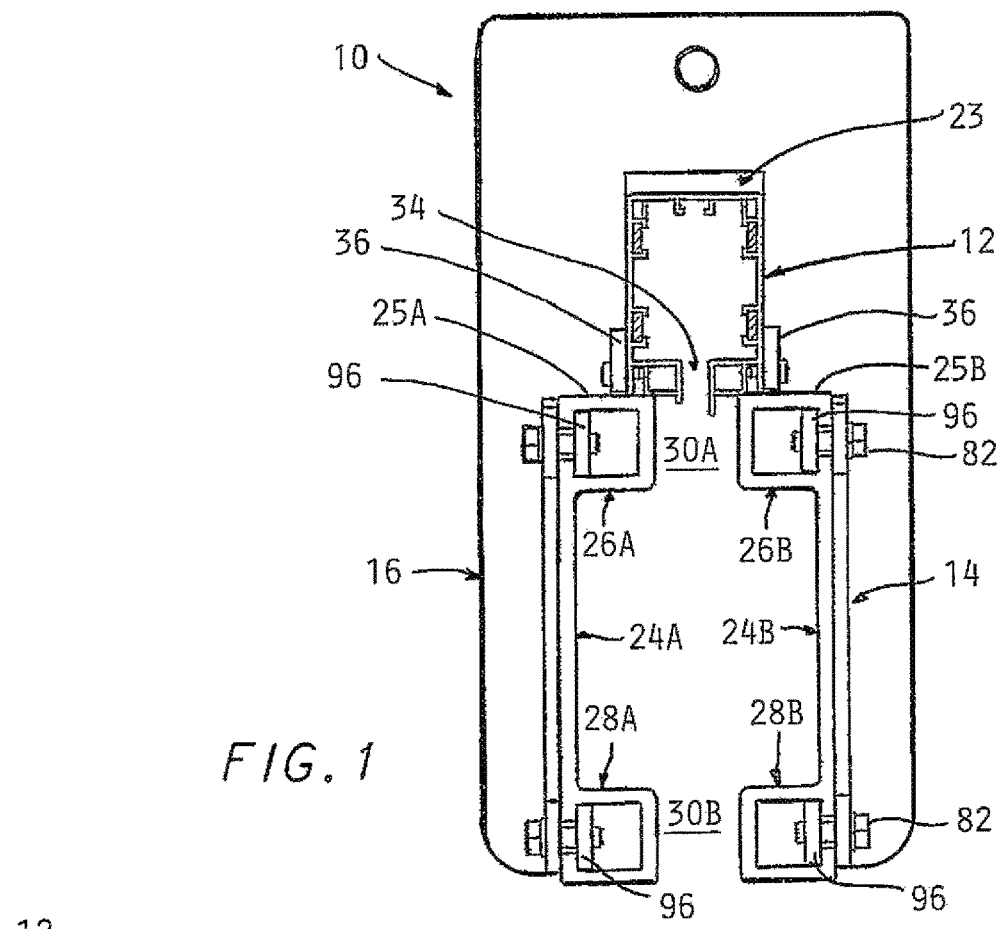
FIG. 1 is an end view of a combined electrical enclosure and a pair of lifting equipment trolley rails vertically aligned with the enclosure abutting each other and held in that position by a support-locator plate according to the invention.
Figure 4:
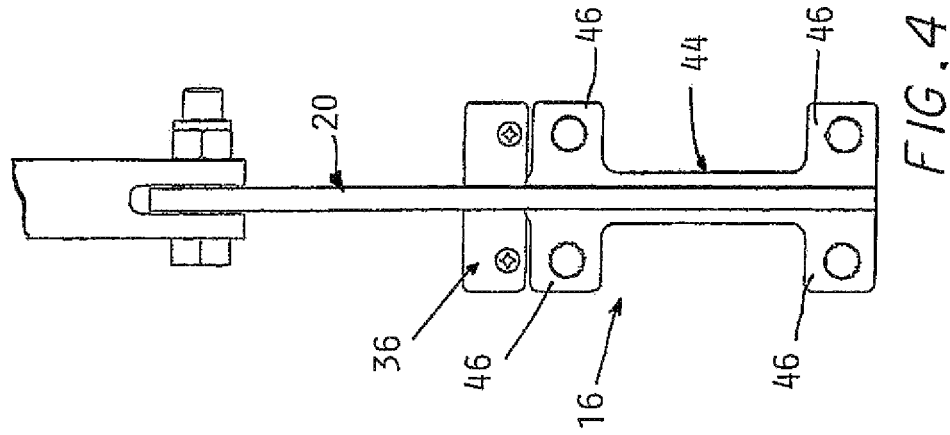
FIG. 4 is a side view of the support-locator plate assembly shown in FIG. 3.
Figure 3:
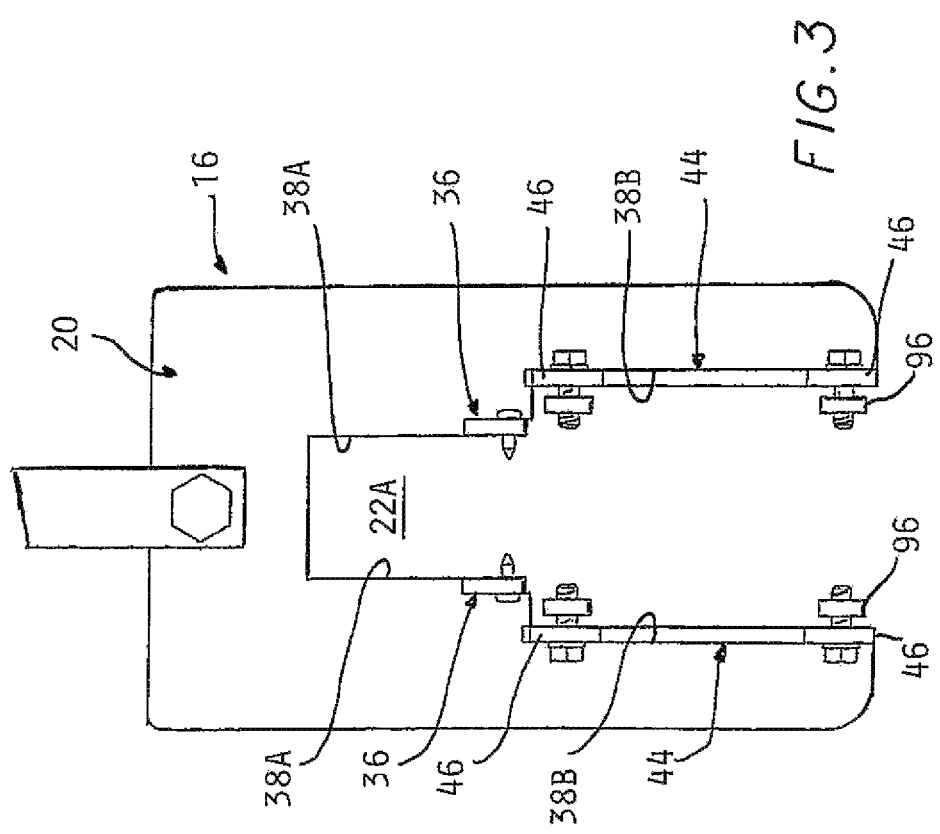
FIG. 3 is a front view of the support-locator plate assembly shown in FIG. 1.

Referring to the Drawings, FIG. 1 depicts an end view of a combination 10 of an electrical enclosure 12 and a support rail assembly 14 which are vertically aligned with each other and securely held together by a support-locator plate assembly 16 which is shown in FIGS. 3 and 4.

The molded plastic electrical enclosure 12 is well known in the art and has metal tracks 18 (FIG. 2) engaged by contacts on an enclosure trolley described below to provide power via a short cable to a hoist or other lift device also described below.

The support-locator plate assembly 16 is shown in detail in FIGS. 3-7, and includes a sturdy rectangular steel plate 20 which sturdiness may be provided by a thickness on the order ⅜ inches.

The steel plate 20 may be rectangular in shape and has a stepped opening 22 open at the bottom end thereof.

Figure 6:
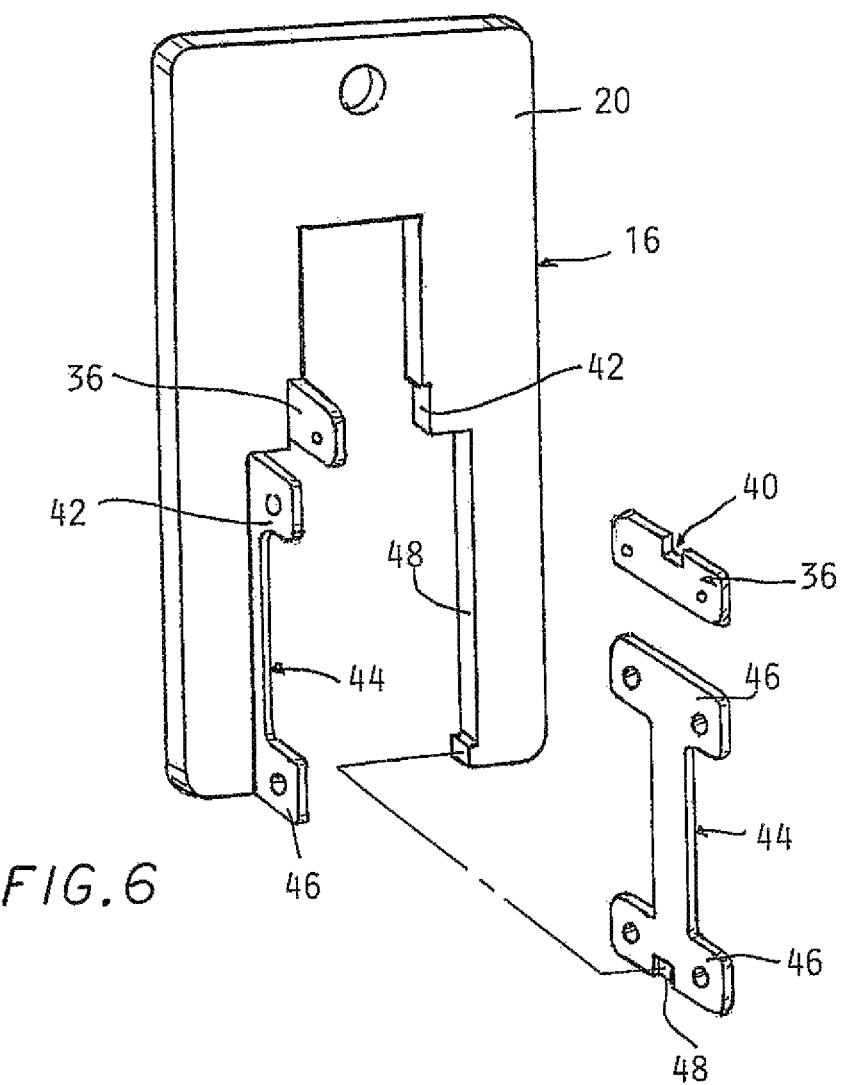
FIG. 6 is a perspective partially exploded view of the support-locator plate assembly shown in FIG. 5.
Figure 7:
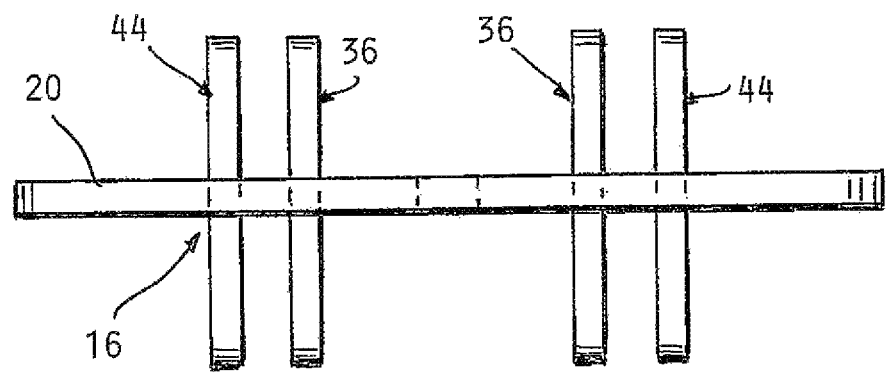
FIG. 7 is a view from the top of the support-locator plate assembly shown in FIGS. 5 and 6.

As best seen in FIG. 6, the plate opening 22 has an upper narrower portion 22A of the opening 22 extending down to a lower wider portion 22B.

The upper portion 22A of the opening 22 is of a width that provides a sliding fit therein of the enclosure 12 while locating the same side to side. An upper clearance space 23 insures that the enclosure 12 is not compressed by contact with the upper end of the upper portion 22A of the opening 20. Rather, the bottom of the enclosure 12 rests on an upper surface 25A, 25B of a pair of spaced apart rail pieces 24A, 25B.

The rail piece 24A each has an upper end portion 26A and the opposite rail piece 24B also has an upper end portion 26B. Rail piece 24A also has a lower end portion 28A as does rail piece 24B and lower end portion 28B.

The upper and lower end portions 26A, 26B project inwardly towards each other but with spaces 30A, 30B therebetween. The upper space 30A allows a downward projecting trolley part 62 extend down into a slot 34 in the enclosure 12 into the space 30A.

The lower space 30B allows the lift trolley lower end (not shown in FIG. 1) to pass out of the space 30B between the rail pieces 24A, 24B as will be described hereinafter.

Figure 5:
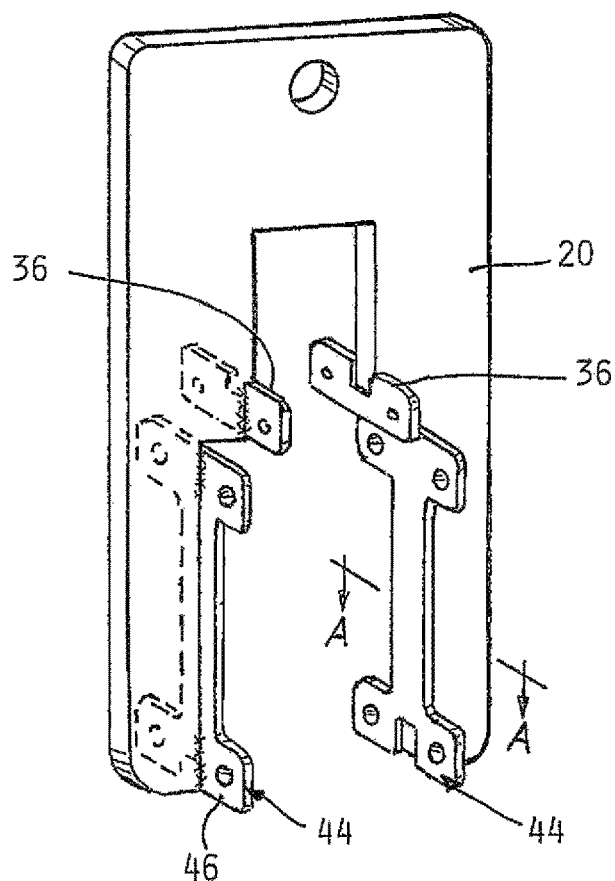
FIG. 5 is a perspective view of the support-locator plate assembly shown in FIGS. 3 and 4.
Figure 5A:
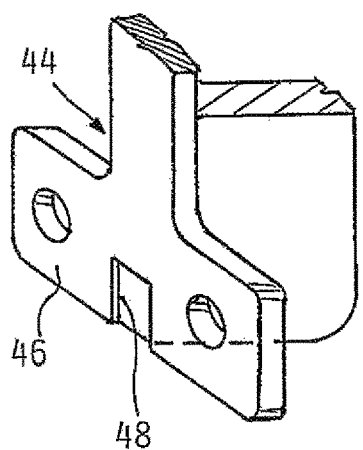
FIG. 5A is an enlarged fragmentary perspective view of the Section A-A taken in FIG. 5.
Figure 5B:
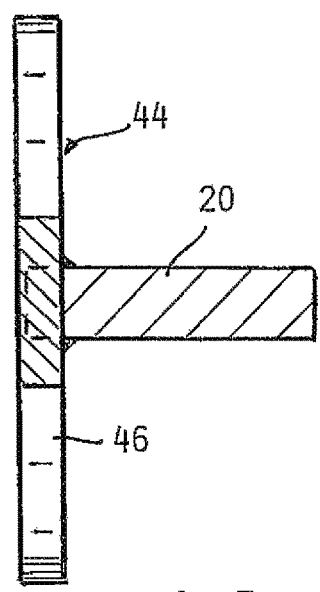
FIG. 5B is an enlarged view from the top of the Section A-A taken in FIG. 5.

The locator-support plate assembly 16 best seen in FIGS. 3-7 is provided with several attachment pieces enabling securement of the enclosure 12 and rail pieces 24A, 24B to the plate assembly 20 with suitable fasteners best seen in FIGS. 5 and 6.

These include a pair of straight horizontal flat links 36 welded to the plate 20 in a position on a respective sidewall 38 of the upper narrow portion of the opening 22A at the bottom thereof as seen in FIG. 3.

The pieces 36 are notched at the middle 40 (FIG. 6) and the sidewalls 42 to simplify the welding of the pieces 36. See also FIG. 5.

A second set of attachment pieces are comprised of flat I-pieces 44 each welded to a respective side 38B of the lower opening portion 22B. This simplifies setting up for the welding of the piece 46 is a flat censing position shown similar to flat links 36.

A notch 48 is formed along each side of the lower opening 22B so as to locate each I-piece 44 preparations to welding at the top and bottom as indicated in the drawings.

Figure 8:
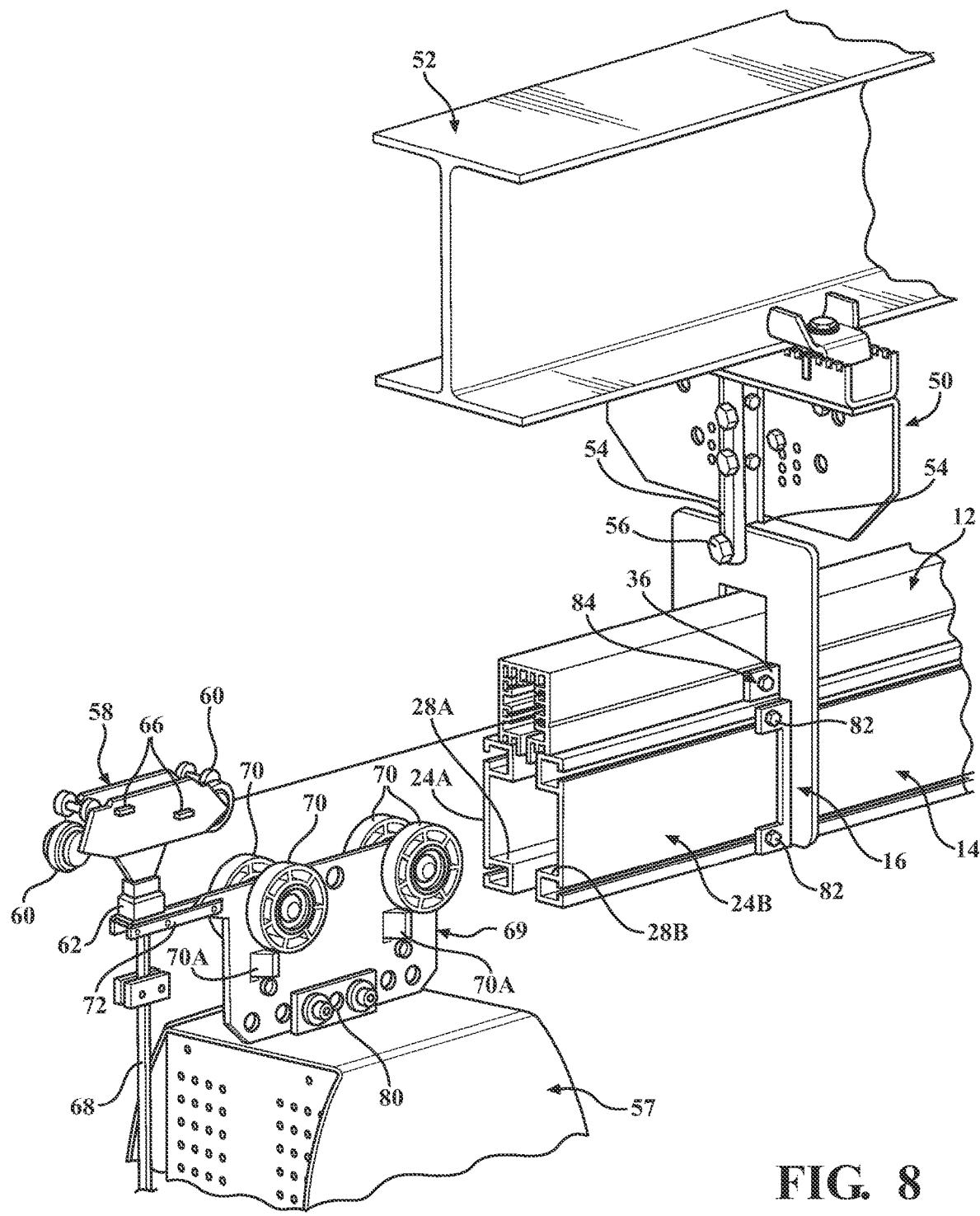
FIG. 8 is a perspective exploded view of the conductor track enclosure and a lift hoist trolley and fragmentary ends of an electrical enclosure and lift support rail pieces supported by a locator-support plate in turn connected to an overhead support beam.

FIG. 8 shows an embodiment of an installation using locator-support guide plate assemblies 16. A conventional hanger arrangement 50 is secured to an overhead beam 52 and is connected to a locator-support plate assembly 16 by a rod 54 connected to upper end thereof by a bolt 56.

A conventional enclosure trolley 58 has guide wheels 60 received in the space 34 (FIG. 1).

A lower part 62 of the enclosure trolley 58 has a short electrical cable 68 connected to a servo hoist 57 in a conventional manner. The cable 68 is supplied with electricity via contacts 66 engaged with conductive tracks 18 (FIG. 1) in the conventional manner.

The servo hoist 57 is supported by conventional rollers 70 on a lift trolley 68 riding on the rail surfaces 28A, 28B.

The two trolleys 58 and 68 must be connected together so as to both move together, offset from each other as shown in FIG. 8.

In the embodiment of FIG. 8, this is done by connecting links 72.

The rail pieces 28A and 28B are connected to the plate assembly 16 by bolts 82 in a manner described below.

Figure 2:
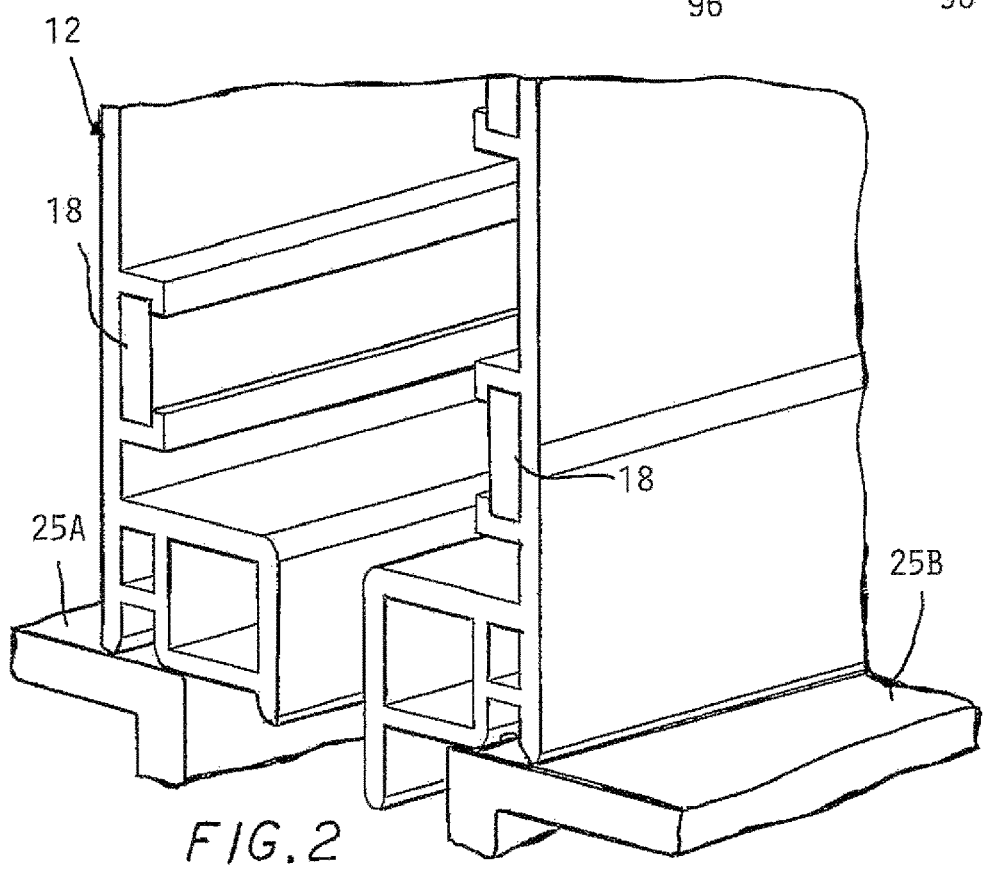
FIG. 2 is a fragmentary perspective end view of an electrical enclosure.

Screws 84 pass through holes in pieces 36 to hold the enclosure 12 in position abutting the top surfaces 25A, 25B of the rail pieces 24A, 24B (FIGS. 1, 2).

Figure 9:
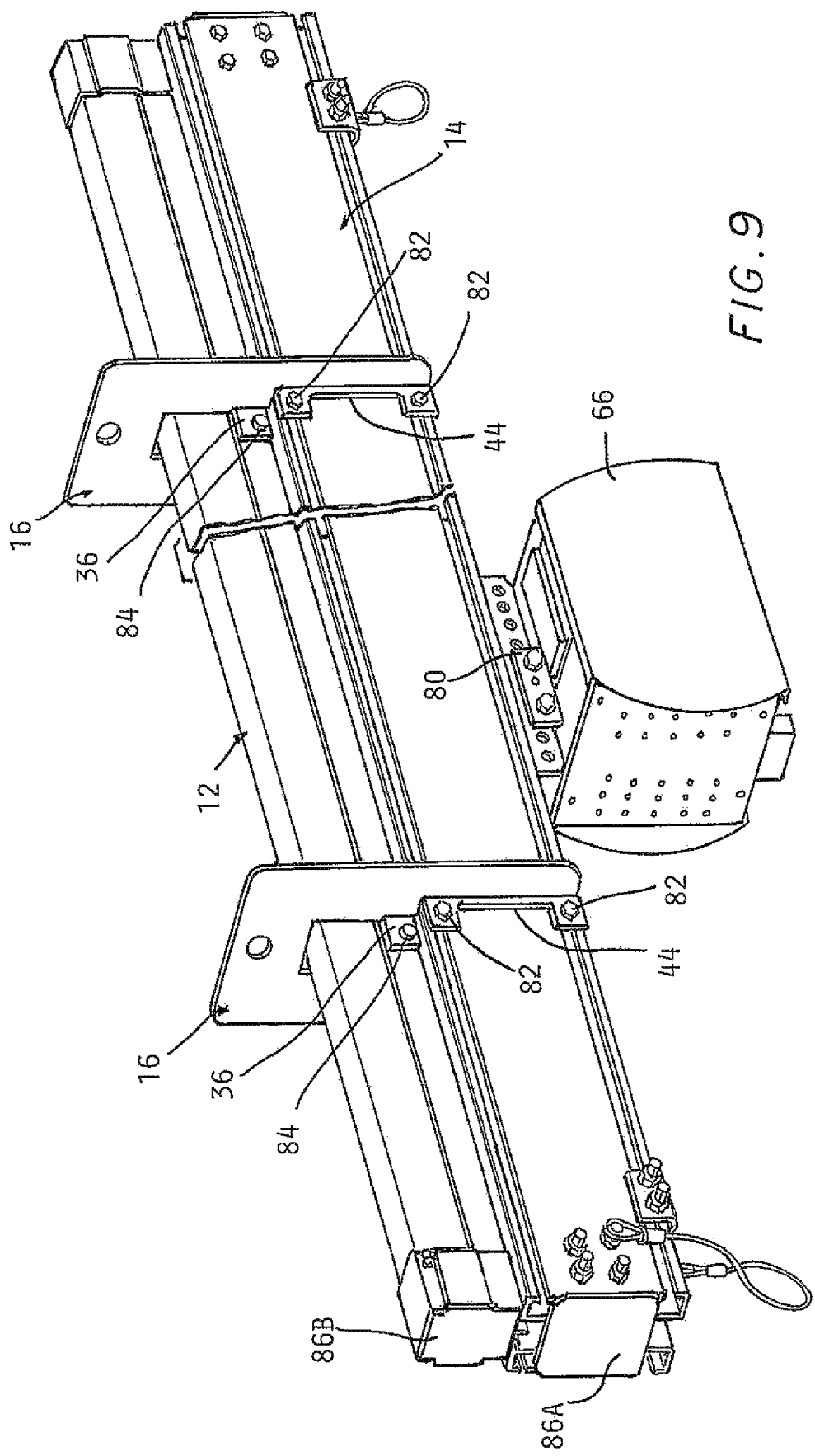
FIG. 9 is a perspective broken away view of a combined enclosure and lift hoist spaced apart support rail pieces supported by two spaced apart locator-support plate assemblies according to the invention, depicting support of lift device comprising a servo hoist.

FIG. 9 shows a completely assembled installation, broken away in the middle. Conventional end stops 86B and 86A are provided.

Figure 10:
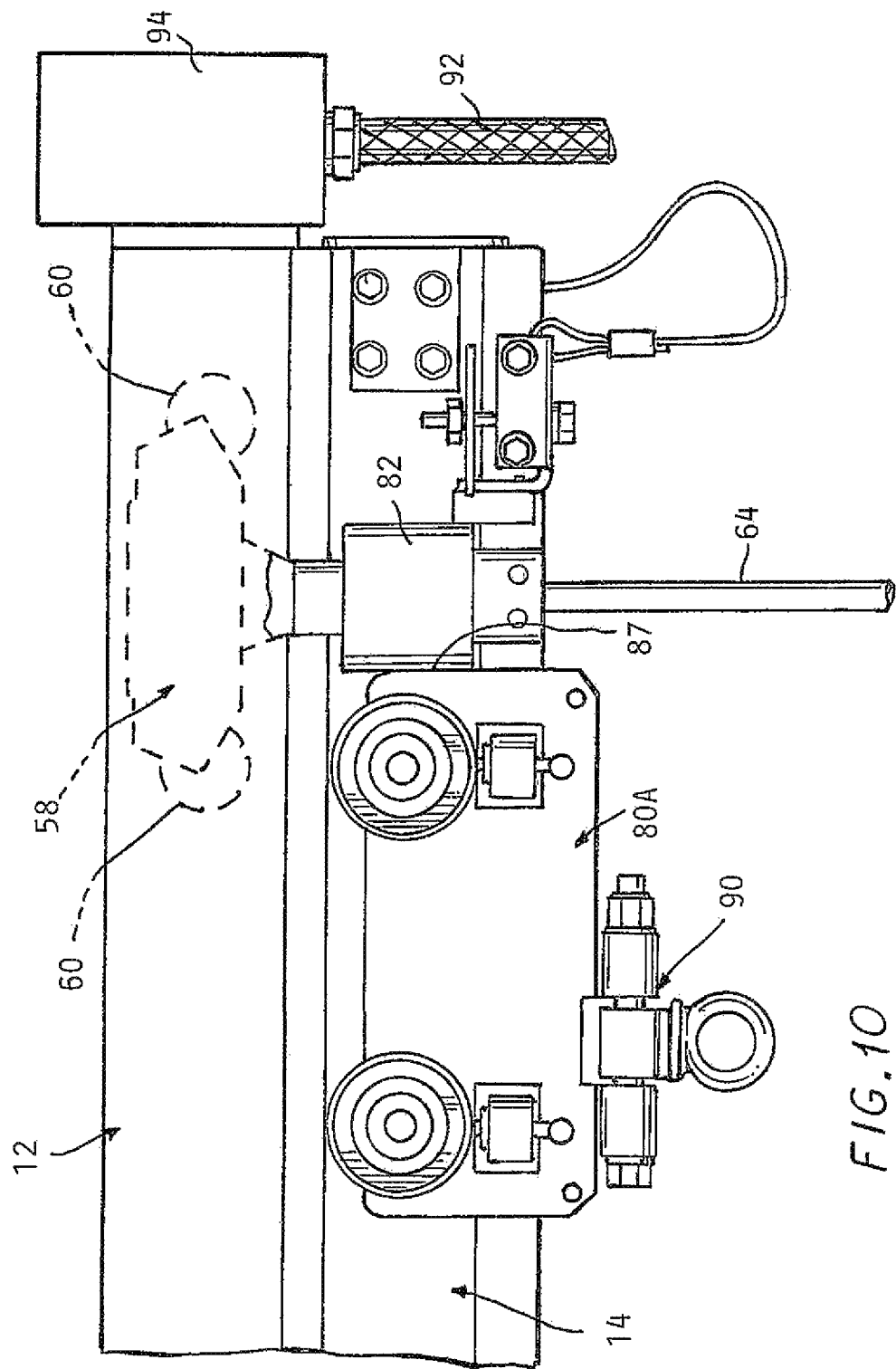
FIG. 10 is a fragmentary side elevational view of an alternative embodiment of a connection between a lift device trolley connected to a track enclosure trolley shown in broken lines as well as a power input cable mounted to one end of the electric enclosure and a power output cable connected to the lift device trolley.

FIG. 10 shows a preferred embodiment in which the enclosure trolley 58 has a fixed metal sleeve 82 attached to the lower part thereof which is welded to the end 87 of a bracket 80A adding a coupling 90 to the hoist (not shown).

This offsets the two trolleys 58 and 68 in a fixed relative position which causes them to move together.

An input power cable 92 is shown connected by a junction box 94 to the tracks 18 of the enclosure 12.

Figure 11:
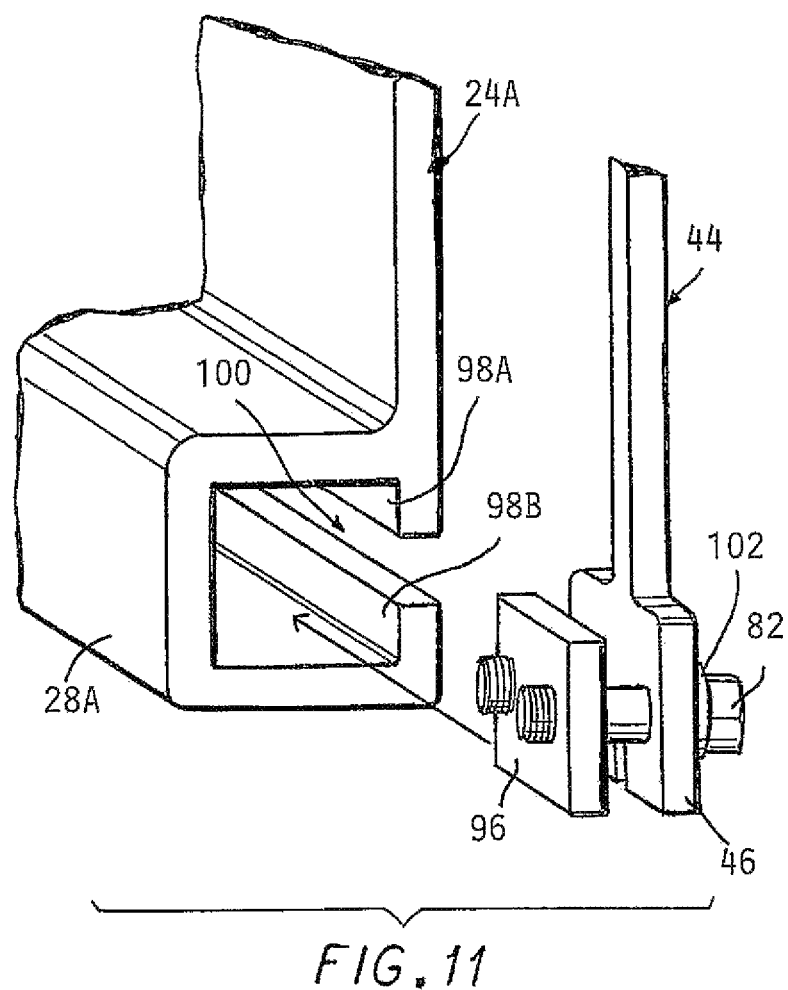
FIG. 11 is an enlarged exploded view of a lower rail end and the lower end of an I-piece in a position to be inserted into the corresponding rail.

FIG. 11 depicts how a connection is made using the I-pieces 44. Bolts 82 are received in respective holes in the lower end 46 of each I-piece 44 and as threaded into holes in a rectangular slider piece 96 matched to the ends of the I-piece. The entire assembly 16 is lined up with rail pieces 28A, 28B. The slider pieces 96 are adjusted to be slidable into the end portions 26A, B and 28A, B (only 28A shown in FIG. 11 to a desired location along the length thereof. The bolts 82 are then tightened to clamp the slide pieces 96 against surfaces 98A, 98B above and below slots 100 formed in each end portion 26A, 26B, 28A and 28B of the rail pieces 24A, 24B (only 28A shown in FIG. 11).

Locking washers 102 may be used to maintain tightness of the bolts 82.

The invention claimed is:

1. A combination comprising:
an elongated electrical enclosure constructed of an electrically insulating material having components powering a traveling hoist containing one or more power cables;
hoist support rails for supporting the traveling hoist, said hoist support rails formed by a spaced apart pair of separate elongated rail pieces, each rail piece having an upper and lower end portion each extending towards each other with a space therebetween; and
one or more support-locator plate assemblies formed with an opening extending up into a lower side thereof to produce a generally inverted U-shaped support locator plate, said opening having an upper portion having parallel sides configured to slidably receive sides of said enclosure and to be located therein; wherein
said opening also having a lower portion with parallel sides spaced further apart than said upper portion sides, said upper portion lower end extending to said lower portion of said opening;
said rail pieces each having an upper end portion extending towards each other and past a respective side of said upper portion of said opening but leaving a gap between said upper end portions to allow a downward extending portion of an enclosure trolley to pass therebetween whereby a part of a lower end of said enclosure rests thereon;
said rail pieces each having a lower end portion extending toward each other but leaving a second gap therebetween allowing a lower portion of a lift trolley to extend through said second gap to allow a roller of the lift trolley to run on an upper surface of said lower end portions of said rail pieces; and
said enclosure trolley and said lift trolley being offset from each other and connected together so as to move together.

2. An inverted U-shaped support locator plate assembly for holding and locating an elongated electrical enclosure on elongated support rails for supporting a travel hoist in vertical alignment therewith, said plate assembly comprising:
a rectangular plate having an opening formed therein extending up from a bottom side, having a generally rectangular upper portion with parallel sides and a lower portion also generally rectangular with parallel sides spaced apart a greater distance than the sides of the upper portion to form a shoulder where said upper and lower portions meet; and a pair of attachment plates each centered just above each of said shoulders extending normally to said plate, said attachment plates having a hole at each end; and an I-shaped piece attached to each respective side of said lower portion of said opening, with a cross part at a top and bottom thereof, each extending normal to said plate with a hole on opposite ends thereof.

3. An arrangement for providing electrical power, comprising:
a lift hoist movable along a pair of spaced apart parallel overhead rails by a lift trolley having rollers supported by a fixed structure;
an elongated rectangular electrical enclosure mounted atop said rails and having a wheeled enclosure trolley movable in a lengthwise direction within said electrical enclosure; and
a plate assembly for holding the rails and the enclosure, including a rectangular plate having an opening formed therein extending up from a bottom side, having a generally rectangular upper portion with parallel sides and a lower portion also generally rectangular with parallel sides spaced apart a greater distance than the sides of the upper portion to form a shoulder where said upper and lower portions meet, the enclosure disposed between the parallel sides of the upper portion, and the rails disposed between the parallel sides of the lower portion.

4. An assembly, comprising:
a lifting hoist having rollers mounted to enable movement along a support rail assembly to enable movement of the hoist along a path in order to be located above one or more loads;
an elongated electrical enclosure aligned with said support rail assembly;
a plate assembly for holding the support rail assembly and the enclosure, including a rectangular plate having an opening formed therein extending up from a bottom side, having a generally rectangular upper portion with parallel sides and a lower portion also generally rectangular with parallel sides spaced apart a greater distance than the side of the upper portion to form a shoulder where said upper and lower portions meet, the enclosure disposed between the parallel sides of the upper portion, and the support rail assembly disposed between the parallel sides of the lower portion; and
one or more electrical contact members of the hoist movable along said path but located within said enclosure and engaging one or more contacts mounted within said enclosure, said contact members connected to a source of electricity,
said one or more movable contact members electrically connected to said hoist to enable operation of said hoist all along said path.

* * * * *